United States Patent
Graham et al.

(10) Patent No.: US 8,041,596 B2
(45) Date of Patent: Oct. 18, 2011

(54) METHODS FOR ESTIMATING SEARCH ENGINE MARKET SHARE FOR WEBSITES

(75) Inventors: Ben Graham, Milford Station (CA); David Ritacco, Truro (CA)

(73) Assignee: Eldis Inc., Truro, Ontario (CA)

( * ) Notice: Subject to any disclaimer, the term of this patent is extended or adjusted under 35 U.S.C. 154(b) by 1075 days.

(21) Appl. No.: 11/851,834

(22) Filed: Sep. 7, 2007

(65) Prior Publication Data

US 2008/0065440 A1 Mar. 13, 2008

Related U.S. Application Data

(60) Provisional application No. 60/842,997, filed on Sep. 8, 2006.

(51) Int. Cl.
*G06Q 30/00* (2006.01)
(52) U.S. Cl. ....................................................... 705/7.29
(58) Field of Classification Search ............ 705/7, 7.29, 705/14.41
See application file for complete search history.

(56) References Cited

U.S. PATENT DOCUMENTS

| | | | | |
|---|---|---|---|---|
| 7,672,894 | B2 * | 3/2010 | Rebane et al. | 705/37 |
| 2006/0248035 | A1 * | 11/2006 | Gendler et al. | 707/1 |
| 2008/0004947 | A1 * | 1/2008 | Mathew et al. | 705/14 |
| 2008/0004955 | A1 * | 1/2008 | Mathew et al. | 705/14 |
| 2008/0027802 | A1 * | 1/2008 | Mendelevitch et al. | 705/14 |
| 2008/0052278 | A1 * | 2/2008 | Zlotin et al. | 707/3 |
| 2008/0059348 | A1 * | 3/2008 | Glassman et al. | 705/35 |

OTHER PUBLICATIONS

Nico Brooks, "The Atlas Rank Report II: How Search Engine Rank Impacts Conversions," Atlas Institute Digital Marketing Insights (2004).*

* cited by examiner

*Primary Examiner* — Beth V Boswell
*Assistant Examiner* — Neil Kardos
(74) *Attorney, Agent, or Firm* — Bereskin & Parr LLP/S.E.N.C.R.L., s.r.l.

(57) ABSTRACT

Several methods for estimating search engine market share for individual and groups of websites are described. Keywords, search domains, seed websites, seed keywords and other starting points are used to estimate relative market share for websites identified in search results at one or more search engines.

8 Claims, 8 Drawing Sheets

METHODS FOR ESTIMATING SEARCH ENGINE MARKET SHARE FOR WEBSITES

FIELD

The embodiments described herein relate to relate to market research for world wide web (WWW) sites or websites.

BACKGROUND

The Internet, and in particular, the world wide web (the "WWW" or "web") has become an important commercial vehicle. Many companies use WWW websites (which are also referred to as "sites") to advertise their wares and products on their own websites and on websites operated by other entities. Many companies provide their products and services entirely through the WWW.

Various search engines have been developed to allow WWW users (or "surfers") to find particular websites. In many cases, a website owner relies on web users finding the website by first conducting a search using a search engine and then selecting the website from the search results.

Search engine market share is a measure of the relative traffic received by sites from search engines in comparison to other websites. Typically it is desirable to measure the relative market share of a website in comparison to other websites in the same or similar commercial space. However, the search engine market share of a website may be measured relative to any other website or group of websites.

It is desirable to provide a tool to estimate the search engine market share for a website relative to other websites

SUMMARY

A first embodiment of the invention provides a method of estimating search engine market share for a plurality of websites, the method comprising: assembling a set of search terms together with the relative frequency of searches conducted using each of the search terms; assembling search engine results for each of the search terms, wherein the search engine results include a listing of websites identified by one or more searches for each of the search terms and ranking information for the websites in each search, wherein the ranking information includes the rank positions of each website in each search; assembling click-through rates for different ranking positions; calculating the market share for at least some of the websites by combining the search engine results and the click-through rates, wherein the market share of a website is calculated by summing the contribution of each keyword to the website's total market share as follows:

$$C = \sum_{r \in R} V_k \times CTR_p \times MS_s$$

$V_k$     relative volume of searches for a given keyword
$CTR_p$ average click-through rate for a given position
$MS_s$   market share (%) for the search engine
$r$       a search engine ranking a single result in a given position $p$ on a given keyword $k$ at a given search engine $s$.
$R$      all the rankings for the keywords in the keyword list In some embodiments, the search engine results for the search terms are assembled for a single search engine and the search engine's market share is deemed to be 100%.

In some embodiments, the search engine results for the search terms are assembled for two or more search engines and wherein the relative market share for each of the search engines in determined before calculating market shares for any of the websites.

In some embodiments, the search engine results for each search term are assembled by performing a search for websites having search engine results on one or more search engines.

In some embodiments, the search engine results for each search term include a listing of websites identified by performing a search using the search term, and wherein a selected number of the identified websites are retained in the search engine results for the search term, based on the ranking of the identified websites in the search.

In some embodiments, the ranking information identifies whether a website is identified in a search as a paid search result or an organic search result.

In some embodiments, the search engine results include only websites identified as pay-per-click results.

In some embodiments, the search engine results include only websites identified as organic results.

Another embodiment of the invention provides a method of identifying a search domain from a list of search engine ranking results, the method comprising: selecting one or more seed keywords; generating a site list containing a listing of websites that have a search engine result in one or more searches using any of the seed keywords; generating a keyword list containing a listing of keywords for which any of the websites in the site list have a search engine result; for each keyword in the keyword list, calculating a degree of correlation based on the number of websites in the site list that have a search engine result for the keyword, wherein the keywords in the keyword list form the search domain.

In some embodiments, the method further includes deleting keywords with a correlation below a correlation threshold from the keyword list.

In some embodiments, the method further includes eliminating websites that have broad content from the site list.

In some embodiments, further includes deleting keywords with a correlation below a correlation threshold from the keyword list and eliminating websites that have broad content from the site list.

Another embodiment of the invention provides a method of estimating the search engine market share of websites relating to a search domain, the method comprising: selecting a search domain; generating a list of all rankings for sites on keywords within the search domain, including the keyword's relative search volume, relative search engine market share for the search engine providing the ranking, estimated click-through rate for the position of the ranking, and the keyword's correlation within the search domain; calculating the contribution of each ranking on keywords in the search domain to the search engine market share of the websites in the site list as follows:

$$C = \sum_{r \in R} V_k \times CTR_p \times MS_s \times P_k$$

| | |
|---|---|
| $V_k$ | relative volume of searches for a given keyword |
| $CTR_p$ | average click-through rate for a given position |
| $MS_s$ | market share (%) for the search engine |
| $r$ | a search engine ranking a single result in a given position $p$ on a given keyword $k$ at a given search engine $s$. |
| $R$ | all the rankings for the keywords in the search domain |
| $P_k$ | the correlation of keyword $k$ within the search domain |

In some embodiments, the method includes, after calculating the degree of relative correlation for each keyword, deleting keywords with a correlation below a correlation threshold from the keyword list.

In some embodiments eliminating websites that have broad content from the site list.

In some embodiments, deleting keywords with a correlation below a correlation threshold from the keyword list and eliminating websites that have broad content from the site list.

Another embodiment provides a method of estimating the search engine market share of websites relating to an archetype site based on their shared relationship to search domains, the method comprising: generating a search domains list; identifying an archetype site; generating a list of search domains relating to the archetype site by containing keywords for which the archetype site has search engine rankings; calculating the aggregate search engine market share for all sites with search engine rankings on keywords from one or more of the search domains in the search domains list as follows:

$$C = \sum_{r \in R} V_k \times CTR_p \times MS_s \times P_k$$

| | |
|---|---|
| $V_k$ | relative volume of searches for a given keyword |
| $CTR_p$ | average click-through rate for a given position |
| $MS_s$ | market share (%) for the search engine |
| $r$ | a search engine ranking a single result in a given position $p$ on a given keyword $k$ at a given search engine $s$. |
| $R$ | all the rankings for the keywords in the search domain |
| $P_k$ | the correlation of keyword $k$ within the search domain |

In some embodiments, the method includes limiting the number of search domains in the search domains list to a subset of the initial search domain list.

Another embodiment provides a method of comparing the search engine market share of a primary website and one or more secondary websites, the method comprising: identifying a primary website; generating a list of secondary websites, wherein a secondary website is a website that has a search engine ranking for at least one keyword for which the primary website also has a search engine ranking; compiling a keyword list containing keywords for which the primary website or at least one second website has a search engine ranking; weighting each of the keywords in the keyword list based on the number of distinct sites that have a search engine ranking for the keyword as a ratio to the total number of the primary and secondary websites; calculating the market share of the primary website by calculating the sum of the market share contribution from each search engine ranking for the site on keywords in the keyword list, as follows:

$$C = \sum_{r \in R} V_k \times CTR_p \times MS_s \times P_k$$

| | |
|---|---|
| $V_k$ | relative volume of searches for a given keyword |
| $CTR_p$ | average click-through rate for a given position |
| $MS_s$ | market share (%) for the search engine |
| $r$ | a search engine ranking a single result in a given position $p$ on a given keyword $k$ at a given search engine $s$. |
| $R$ | all the rankings for the keywords in the keyword list |
| $P_k$ | the correlation of keyword $k$ within the keyword list |

In some embodiments, the list of secondary websites is limited to websites having at least one of the following characterstics: a minimum threshold inbound correlation; a minimum threshold outbound correlation; a minimum number of overlapping keywords for which both the primary site and each of the secondary websites has a search engine result.

Another embodiment provides a method of estimating search engine market share for two or more websites, the method comprising: assembling a keyword list including two or more keywords; assigning relative weightings to each of the keywords; calculating the market share of the primary website by calculating the sum of the market share contribution from each search engine ranking for the site on keywords in the keyword list, as follows:

$$C = \sum_{r \in R} V_k \times CTR_p \times MS_s \times W_k$$

| | |
|---|---|
| $V_k$ | relative volume of searches for a given keyword |
| $CTR_p$ | average click-through rate for a given position |
| $MS_s$ | market share (%) for the search engine |
| $r$ | a search engine ranking a single result in a given position $p$ on a given keyword $k$ at a given search engine $s$. |
| $R$ | all the rankings for the keywords in the keyword list |
| $W_k$ | the relative weighting of keyword $k$ within the keyword list |

Various additional aspects and features of the invention are identified in the following description of several embodiments of the invention.

BRIEF DESCRIPTION OF THE DRAWINGS

Several embodiments of the present invention will now be described in detail with reference to the drawings, in which.

DETAILED DESCRIPTION OF EXEMPLARY EMBODIMENTS

Figure 1:
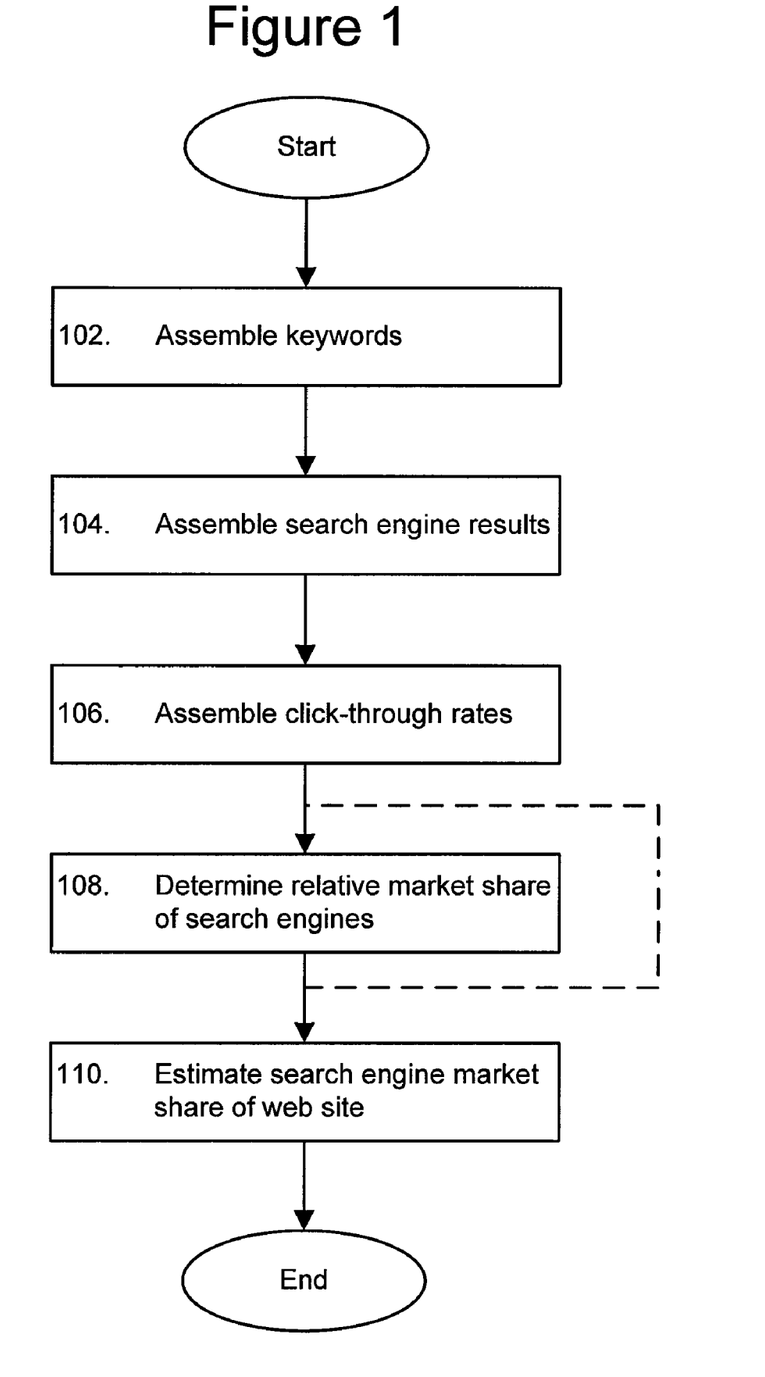
FIG. 1 illustrates a method of estimating the search engine market share for a plurality of website.

Reference is first made to FIG. 1, which illustrates a method 100 according to a first embodiment of the invention. Method 100 is a method of estimating the search engine market share for a plurality of websites.

Method 100 begins in step 102. In this step a list of keywords or search terms is assembled together with the relative volume or number or frequency of searches performed using each of the keywords. The terms "search term" and "keyword" are used interchangeably herein. A particular search term or keyword may be a single word or a combination of words or phrase. For example, an inventor conducting a search for information about patents might conduct a search with the search phrases "patent law", "patents" or "intellectual property law firms", each of which is considered a single distinct keyword. A list of commonly used keywords and the relative frequency with which each keyword is searched on may be assembled by recording actual searches performed using a search engine such as Google. Alternatively, lists of frequently used keywords are commercially available from various sources such as WordTracker, Trellian and Overture. These sources can also provide the frequency with which each keyword is used.

Method 100 then proceeds to step 104. In this step, search engine results for each of the search terms assembled in step 102 are assembled using one or more search engines. The websites identified in each search are recorded together with the position of each website in the search results and the keyword used to conduct the search. Each website that is identified in a search conducted using a particular keyword may be said to have a search engine result or ranking or listing for that keyword. Optionally, a website may be considered to have a search engine result or ranking for a keyword only if the website is ranked within a selected position in the search results. For example, in some embodiments, only the first ten websites listed in a search results set may be considered to have a search engine result or ranking for a search keyword.

In this embodiment, step 104 is performed using a spider program, which mimics the behavior of a user with a web browser and requests search results pages from the search engines. This process may be repeated for each of the keywords from step 102 for any number of search engines. Websites identified by each search are recorded along with the ranking of each website for each keyword on each search engine. In other embodiments, any method of identifying websites that have a search engine result for a particular keyword may be used. For example, each keyword search may be performed manually and the corresponding search engine results may be manually tabulated to form a database of websites that have a search engine result in response to the various keywords for which searches are performed. Alternatively an application programming interface (API) may be provided by the search engine to facilitate automated querying of its search results.

In this embodiment, only websites ranked in the first ten positions in response to a keyword are recorded. Only these websites are considered to have search engine results for the keyword. Websites with a lower rank are ignored. In other embodiments, any number of websites may be recorded and treated as having a search engine result in response to a keyword.

The data is recorded such that it may be indexed by the website, search engine, keyword, date and ranking information (organic/paid, ordinal rank, page location, indentation or formatting, etc.). The data may also be filtered by any of these criteria in order to analyze only portions of the data.

Method 100 then proceeds to step 106. In this step, click-through rates for different ranking positions on a search engine results page are assembled. For example, a search engine may provide search engine results in a list of ten websites per results page, with the sites ranked in order from most relevant to less relevant, based on ranking criteria programmed into the search engine. The first ranked site may be selected by a searcher 25% of the time, while the fifth ranked site is only selected 5% of the time. The statistical likelihood that a site in a particular position on a search engine results page may be clicked is calculated based on actual user behavior when using the search engine. Alternatively, the likelihood that a site in a particular position will be selected or "clicked-through" by a searcher may be estimated in any manner. Some search engines provides both "paid" or "pay per click" or "PPC" search engine results and "organic" search engine results. The PPC results are for websites for which a website operator has paid a fee to be listed for one or more keywords. In response to a search for the purchased keywords or other associated keywords, the website is given a preferential position in the search engine results. Organic results are typically based on the frequency of the keywords in the text portion of the websites and other factors.

Method 100 then optionally proceeds to step 108. Step 108 is performed if search engine results for more than one search engine were recorded in step 104. If search engine results for only one search engine were recorded in step 104, then step 108 is skipped and method 100 proceeds directly to step 110.

In step 108, the relative market share of each of the search engines used in step 104 is determined. This may be done, for example, by determining the number of searches performed by web surfers using each search engine over some time period. The number of searches performed with each search engine divided by the total number of searches is the market share for that search engine.

Alternatively, other methods may be used to estimate search engine market share. Search engine market share may be estimated by examining usage logs from a sample of Internet users, which may be provided by an Internet service provider (ISP). Search engine market share data is also publicly available in some cases, and more precise data may be purchased from market research firms.

Method 100 then proceeds to step 110. In the step, the search engine market share of a given site is calculated.

The search engine market share contribution c (also referred to as "contribution" herein) for a single keyword ranking r (where each ranking is a search engine result for a single keyword k in a set position p at search engine s) is calculated as follows:

Contribution of a single ranking to search engine market share of a website          Equation 1

$$c_r = V_k \times CTR_p \times MS_s$$

$c_R$     contribution for a given ranking (a single result in a given position $p$ on a given keyword $k$ at a given search engine $s$)

$V_k$     relative volume of searches for a given keyword $CTR_p$     average click-through rate for a given position $MS_s$     market share (%) for the search engine The total contribution C of all keywords to the market share of a given website may be calculated by summing the market share contribution c for each keyword ranking r for which the website had a search engine result in step 104. The total contribution C is calculated as follows:

Total Contribution $$C = \sum_{r \in R} V_k \times CTR_p \times MS_s \qquad \text{Equation 2}$$

$V_k$    relative volume of searches for a given keyword
$CTR_p$  average click-through rate for a given position
$MS_s$   market share (%) for the search engine
$r$      a search engine ranking: a single result in a given position $p$ on a given keyword $k$ at a given search engine $s$.
$R$      all the rankings for the keywords in the keyword list The total contribution C reflects the search engine market share of the given website relative to other websites, allowing their relative market shares to be compared. The search engine market share of a given website within a group of websites is estimated by dividing the search engine market share of the given website by the total search engine market shares of all of the websites. The total search engine market shares of all of the websites reflects the total market size for the group of websites.

A second embodiment of the invention will now be described. This second embodiment may be used to determine the search engine market share of a given "seed website" in comparison to other websites for entities in the same industry. This permits comparison of websites between competitors in a given space.

Websites for entities in the same space may contain similar keywords. Often such keywords will be commonly used by web surfers interested in the space to find those websites. Website owners will generally prefer that their website has a higher ranking on search engine results pages than the websites of their competitors.

A "search domain" is a set of keywords that are highly correlated with each other. This correlation is based on the overlap of sites within their listings. Keywords that are correlated tend to have the same sites returned in searches conducted using the keywords. Websites for entities in the same market or industry will often have high search engine rankings for similar groups of keywords, creating search domains of highly correlated keywords.

Figure 2:
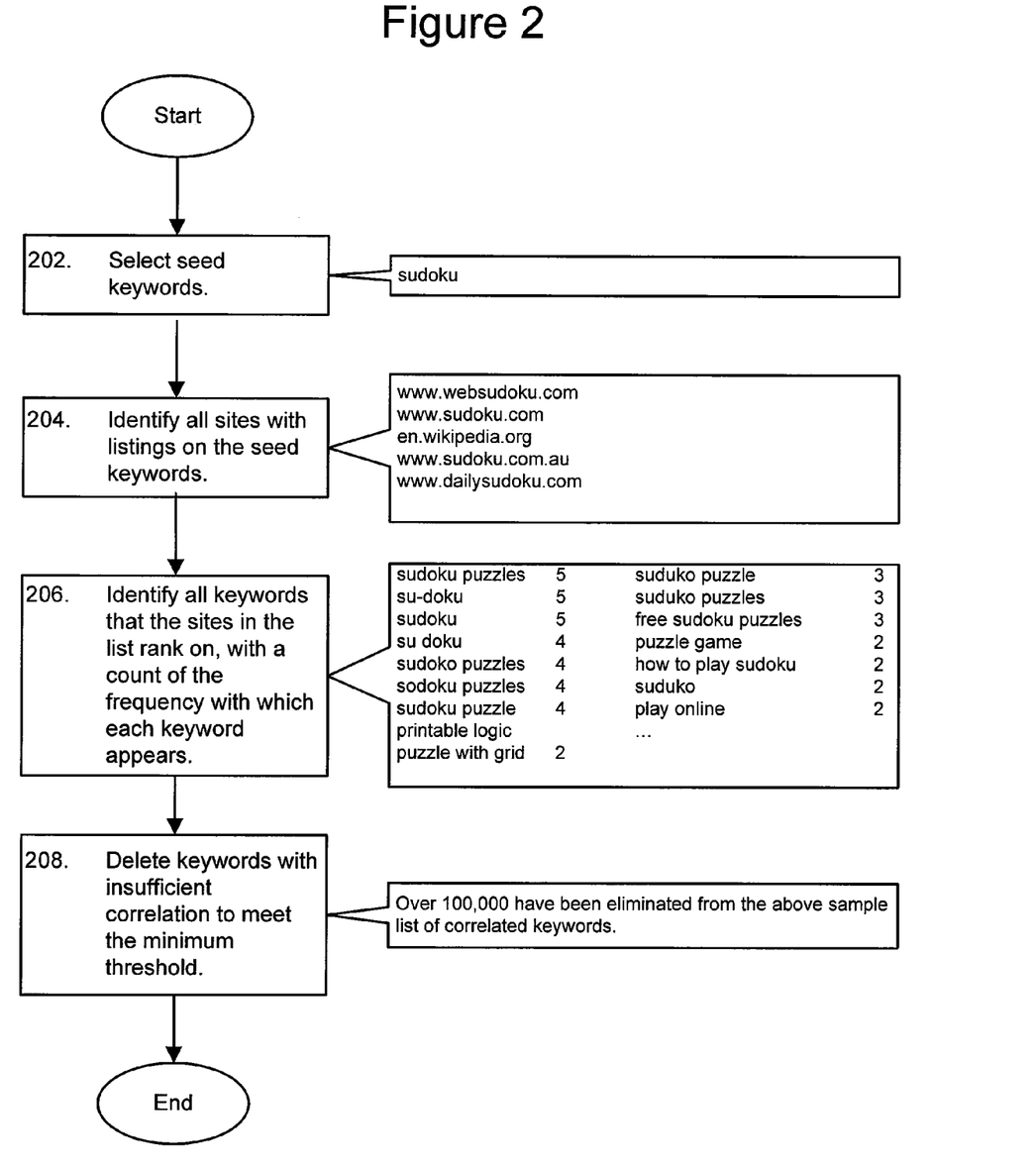
FIG. 2 illustrates a method of building search domains.

Search domains may be built according to method 200, which is illustrated in FIG. 2. Method 200 will be explained in the context of an example relating to the currently popular math game "Sudoku".

Method 200 begins in step 202. In this step, one or more seed keywords that are relevant to the website of interest are selected. The seed keywords are used as the base for a search domain that is relevant to the website of interest. In the present example, the single keyword "sudoku" is selected as the seed keyword.

Method 200 then proceeds to step 204. In this step, a site list is generated of websites that have a search engine result for the seed keywords. As in method 100, the site list may be restricted to a selected number of websites, such as the highest ranked ten websites.

In the present example, the site list of websites that have a search engine result for the seed keyword "sudoku" includes the following websites:

www.websudoku.com
www.sudoku.com
en.wikipedia.org
www.sudoku.com.au
www.dailysudoku.com Method 200 then proceeds to step 206. In this step, a keyword list is created of some or all the keywords for which any of the websites in the site list have a search engine result. For each keyword in the keyword list, a degree of correlation may be determined by counting the number of websites on the sites list that have a search engine result for the keyword. The degree of correlation may be expressed as a percentage of the counted sites relative to the number of websites on the sites list. If a single seed keyword was selected in step 202 it will have a correlation of 100%. If multiple seed keywords were selected in step 202 they may have a correlation of less than 100%. Any keywords for which every website on the sites list has a search engine result will also have a correlation of 100%. Most keywords will typically have a lower correlation.

In the present example based on the single seed keyword "sudoku", there are thousands of keywords for which at least one of the websites in the site list has a search engine result. Here are some of the most highly-correlated:

free sudoku puzzles
how to play sudoku
play online
printable logic puzzle with grid
puzzle game
sodoku puzzles
su doku
sudoko puzzles
sudoku
su-doku
sudoku puzzle
sudoku puzzles
suduko
suduko puzzle
suduko puzzles Method 200 then proceeds to optional step 208. In this step, keywords may be deleted from the keyword list if their correlation falls below a threshold. For example, the threshold may be set at a percentage of the websites on the sites list. Alternatively, the threshold may be set at a particular number of websites on the site list.

In the sudoku example one of the sites in the list was en.wikipedia.org, a website with hundreds of thousands of listings. Having so many listings makes Wikipedia a very broad site, about many different and unrelated topics. Being broad means that it brings in tens of thousands of additional keywords at step 206 that have nothing to do with sudoku, but it doesn't mean that Wikipedia is not about sudoku at all. It simply means that it is about sudoku and much more.

In this example, a minimum correlation of at least two sites from the site list is required for a keyword to be retained on the keyword list.

In other embodiments, step 208 includes an optional process of eliminating sites that have broad content and as a result have search engine results for many keywords that are not related to one another and have little or no correlation with other websites in the sites list may be implemented to remove such sites from the analysis since such sites contribute little to the identification of a search domain. This may be done, for example, by removing from the site list any website that has previously been identified as having broad content. Sites may be identified as having broad content if they are known to be related to more than a few related topics. Examples of such sites includes news websites, encyclopedia type websites, open discussion forums, social networking websites on which user may discuss a wide variety of topics, etc. If this optional process of eliminating websites with broad content from the site list is performed, then the process of deleting keywords from the keyword list if their correlation falls below a threshold is performed after first having eliminated the websites with broad content.

Step 208 may be omitted in some embodiments of the invention.

The keywords in the keyword list after step 208 (or step 206) form a search domain from the seed keywords.

An alternative embodiment has the seed keywords for a search domain being all the keywords for a given web site, such that the search domain is typified by that website.

Typically, a database will be created of all possible search domains by repeating method 200 using every keyword within the greater keyword list. To reduce the size of this database of search domains (which includes the keywords and their correlations) the list of seed keywords may be limited based on the keyword's relative search volume or some other limiting factor.

Figure 3:
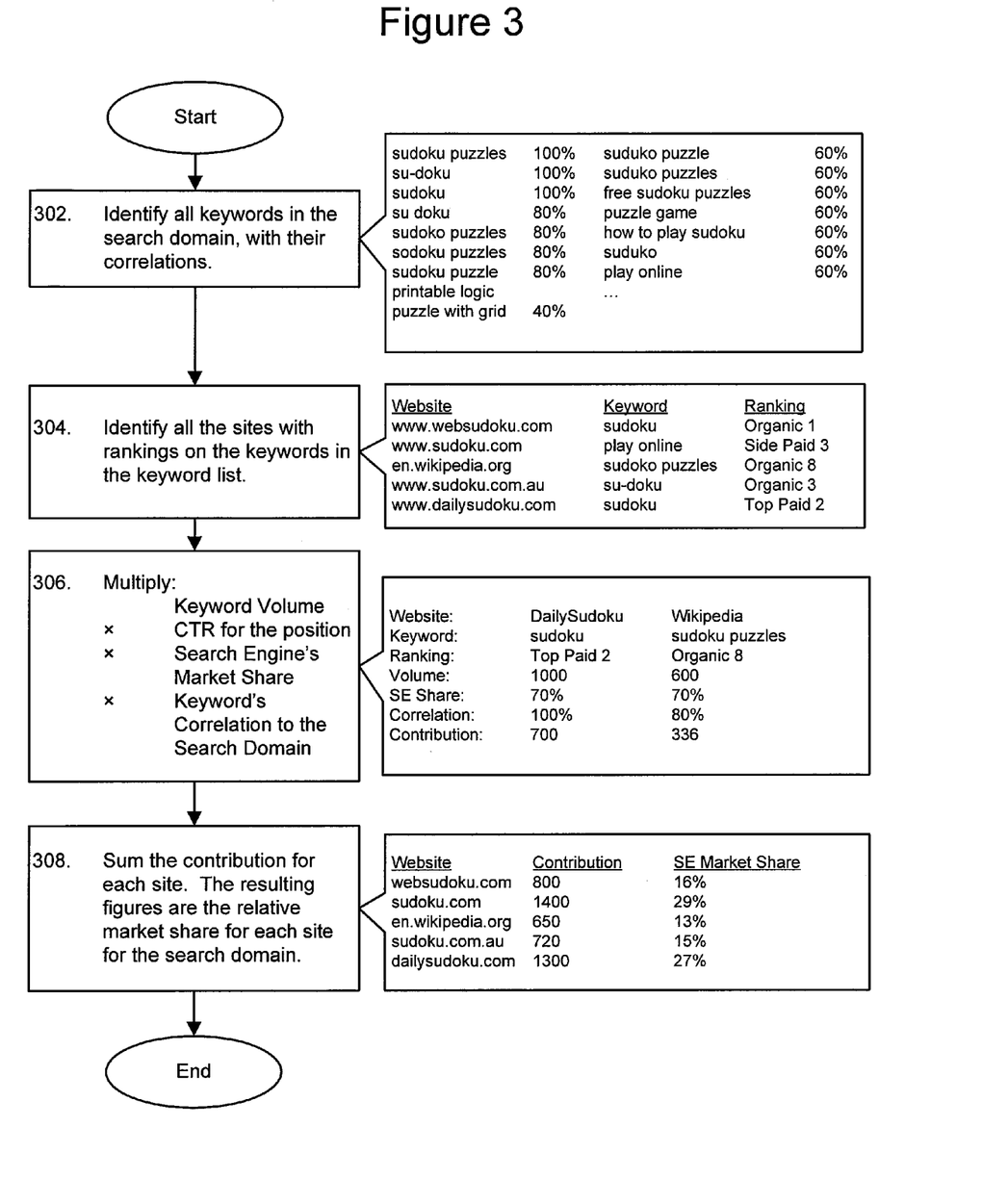
FIG. 3 illustrates a method of using a search domain to estimate search engine market share for the related websites.
Figure 4:
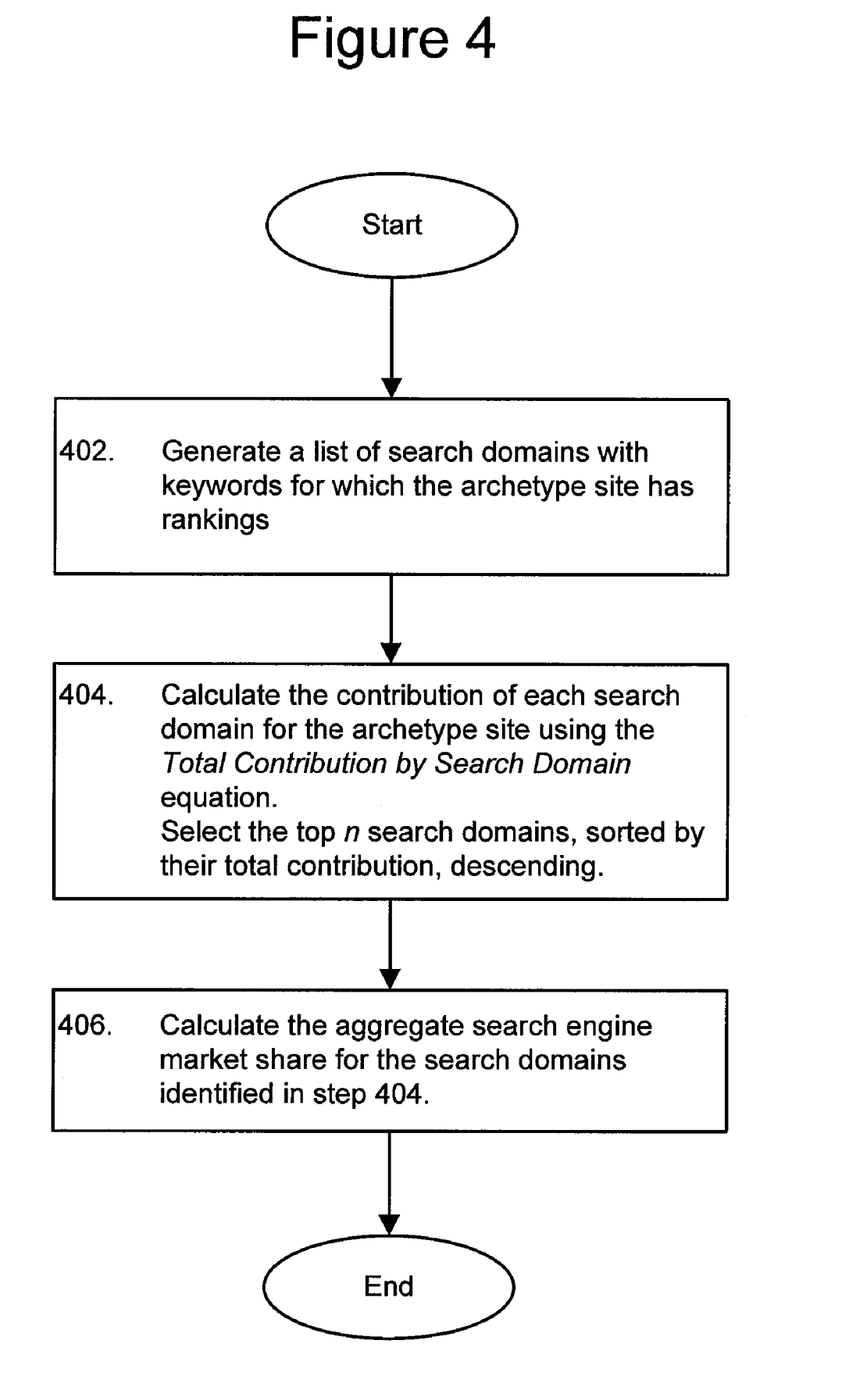
FIG. 4 illustrates a method of using an archetype website to identify search domains which may be relevant to a given website.

Maintaining a database of search domains speeds up the process of method 300, but requires pre-processing time and greater storage capacity. Because method 400 requires identification of relevant search domains it is vastly more efficient to pre-process and store potential search domains than it is to process them in response to a request.

The search domain identified in method 200 from a seed keyword may be used to estimate search engine market share for the websites that have search engine results for keywords in the search domain.

Reference is made to FIG. 3, which describes a first method 300 for using a search domain to estimate search engine market share for the related websites.

Method 300 begins in step 302 in which the relative correlation for each keyword remaining in the search domain after step 208 is determined.

Method 300 then proceeds to step 304 in which all of the websites that have search engine rankings on any of the keywords in the search domain are identified.

Typically, steps 302 and 304 are performed in conjunction with step 208 if methods 200 and 300 are to be performed together.

Method 300 then proceeds to step 306, in which the total contribution of all rankings on keywords in the search domain to the search engine market share for the websites is calculated using Equation 3:

Total Contribution by Search Domain $$C = \sum_{r \in R} V_k \times CTR_p \times MS_s \times P_k \qquad \text{Equation 3}$$

$V_k$    relative volume of searches for a given keyword
$CTR_p$    average click-through rate for a given position
$MS_s$    market share (%) for the search engine
$r$    a search engine ranking a single result in a
     given position $p$ on a given keyword $k$
     at a given search engine $s$.
$R$    all the rankings for the keywords in the search domain
$P_k$    the correlation of keyword $k$ within the search domain In Equation 3 and FIG. 3 the contribution of each keyword is weighted by its correlation to the search domain using the correlation $P_k$ of a keyword within the search domain.

Alternatively, the correlation $P_k$ of the keywords may optionally be ignored. This may have the effect of shifting the search engine market share in response to large number of low-correlation keywords. In the sudoku example, play online and puzzle game could be keywords with high search volume that are related to sudoku but not as closely as the keyword sudoku puzzles. Accordingly, these keywords have a lower correlation than the keyword sudoku puzzles. If these keywords were to influence market share as much as the keyword sudoku puzzles then the estimated search engine market share may be skewed away from topics related to the seed keyword initially used to generate the search domain in steps 208, 302 and 304.

In another embodiment of the invention, an archetype website is used to identify search domains which may be related to a given site. Reference is made to FIG. 4, which illustrates a method 400 for doing so. Typically, the archetype site will be the user's site, a website of a close competitor to the user or some other web site of interest.

Calculating relative search engine market share for websites using an archetype site requires that there be a comprehensive list of all potentially relevant search domains. The search domains are calculated as in method 200, and saved in a database of keywords and their correlations to the search domain.

Method 400 begins in step 402. In this step, a search domains list is generated. The search domains list is a list of all search domains that contain keywords for which the archetype website has search engine results. Optionally, the number of search domains in the search domain list may be limited to a specified number of search domains. Each keyword for which the archetype website has search engine results could potentially be a member of many search domains, meaning that the archetype website could have keywords in many search domains.

Including many search domains (or search domains with large keyword lists) in the search domains list greatly increases the processing time required to complete method 400. The system requires methods to be put into place to limit the number of search domains in the search domains list. In one embodiment, not every search domain that includes a keyword that the archetype site ranks for will be included. The list can be restricted to only search domains where the given keyword is a very highly correlated keyword (a seed keyword or closely related keyword, for instance). Another alternative is to limit the total number of search domains by including a restrictive threshold on the minimum number of keywords in each search domain so that very small search domains that will not increase the overall breadth of the keyword list are ignored.

Method 400 then proceeds to step 404. In this step, the top contributing search domains are selected. The total contribution by search domain equation (Equation 3) is used to calculate the total search engine market share contribution for each search domain for the archetype site, and then the top search domains by contribution are selected. The list may optionally be shortened by:
    selecting a specific number of search domains from the list (as in FIG. 4),
    selecting only those search domains with a search engine market share contribution (as a percentage of the archetype's total contribution calculated using method 100)

above a predetermined level (keeping in mind that there may be significant keyword overlap within the search domains), or selecting the number of search domains required to have their total contribution equal or surpass a certain ratio when compared against the site's total contribution (calculated using method 100).

Method 400 then proceeds to step 406. In this step, the aggregate search engine market share for all sites with a market share in any of the search domains can be estimated using the total contribution by search domain equation. This identifies the competitors in a website's industry without need of input from the user. A list of keywords with their relevance (sum of correlation×search volume) can be produced that will provide guidance to the user about what keywords are associated with the archetype site, even if it doesn't have any search engine results for some of the keywords.

Figure 5:
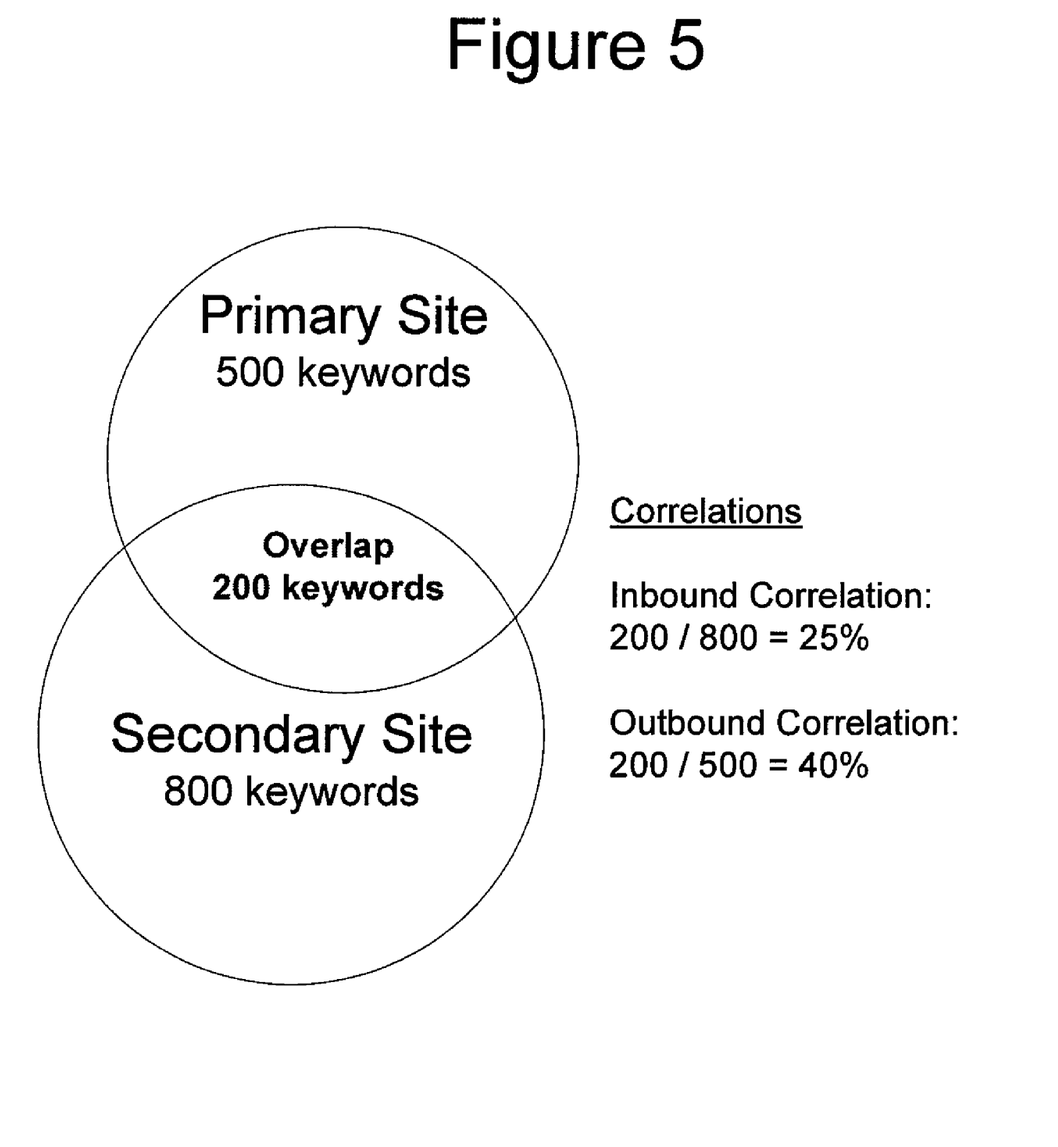
FIG. 5 illustrates a concept of site correlation.

Reference is next made to FIG. 5, which illustrates a concept of site correlation. Site correlation is based on the overlap in keyword rankings between any two sites, which are referred to as the primary site and the secondary site. It consists of two parts: inbound correlation, which is the percentage of the secondary site's keywords (keywords for which the secondary site has search engine rankings) which are represented in the overlap, and outbound correlation, the percentage of the primary site's keywords in the overlap.

When a secondary site has a high inbound correlation with the primary site, it indicates that the secondary site is mostly about things which the primary site is also about. A high correlation is usually any number above 60%, but can be above 90% even in sites with large numbers of keywords.

When a primary site has a high outbound correlation with a secondary site, it indicates that the primary site is about things which the secondary site is also about. When there is disparity in correlations, it indicates that one site is about a subject which is only a subset of the other site.

Figure 6:
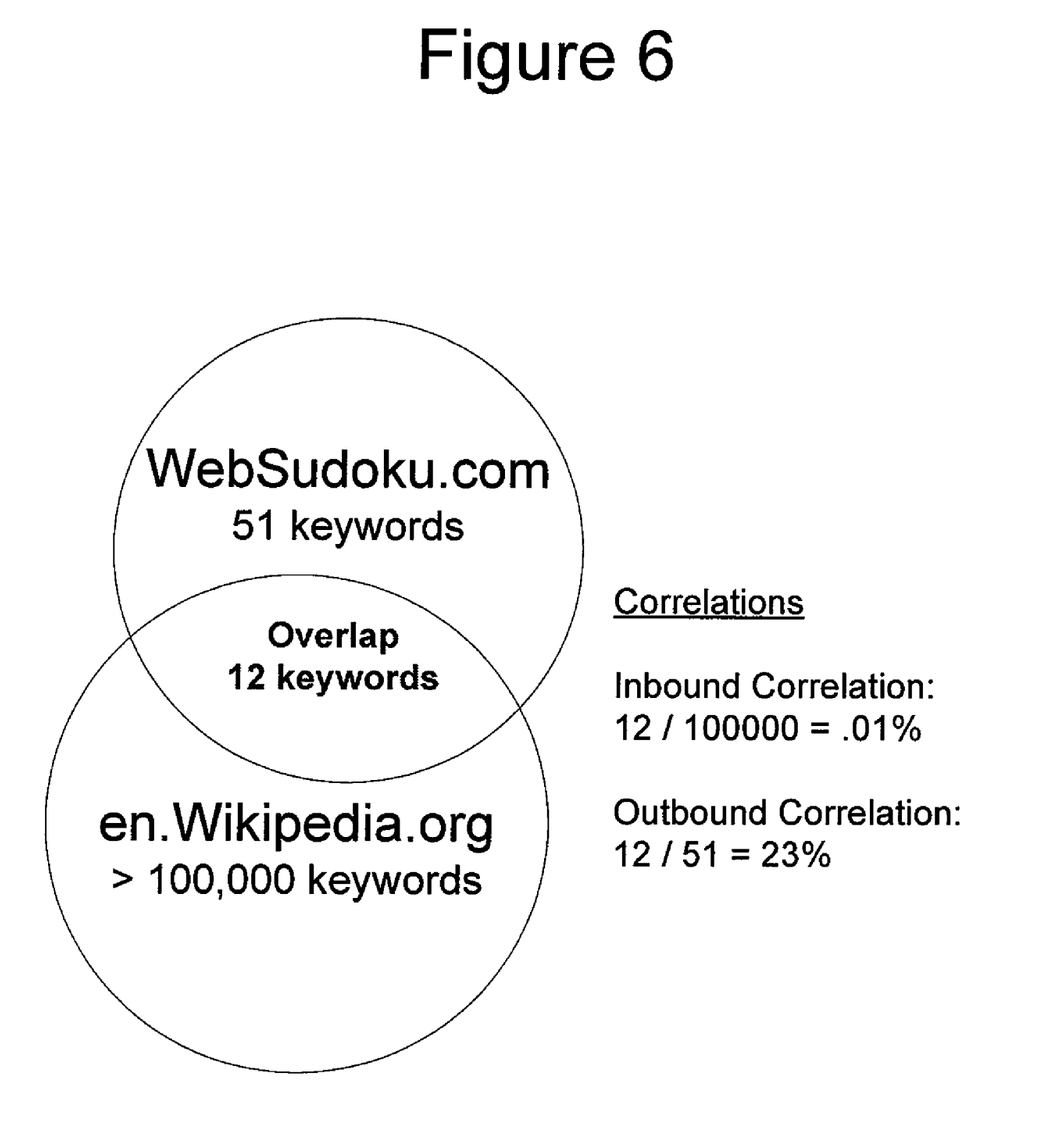
FIG. 6 illustrates inbound and outbound correlations.

In the sudoku example WebSudoku.com is almost certainly about the game of sudoku. Wikipedia.org is also about sudoku but sudoku represents only a tiny fraction of what Wikipedia is about, far less than 1%. In this example WebSudoku has a moderate outbound correlation with Wikipedia (23%) but the inbound correlation is very low (0.01%), as is illustrated in FIG. 6. Even without an understanding of Wikipedia or seeing the total keyword counts for the two sites, it is clear that Wikipedia is a much broader website than WebSudoku but that much of what WebSudoku is about is covered within Wikipedia. These outbound and inbound correlation values suggest that WebSudoku is a niche site in relation to Wikipedia.

Figure 7:
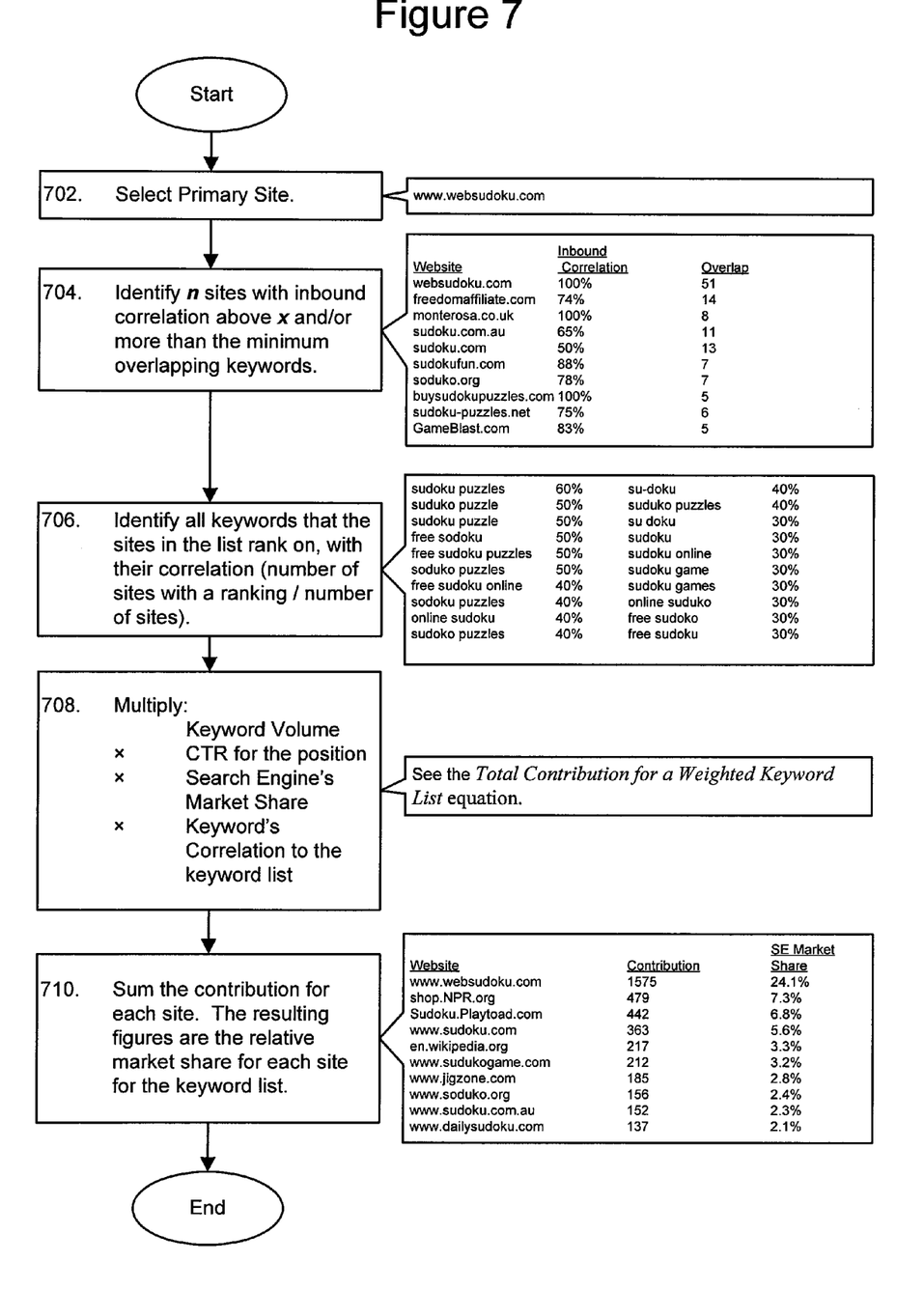
FIG. 7 illustrates a method of estimating search engine market share using site correlation.

Reference is next made to FIG. 7, which illustrates a method 700 according to another embodiment of the invention. In method 700, search engine market share is calculated using site correlation by first identifying a primary site. Method 700 begins in step 702, in which the primary site is identified. In most cases the primary site will be the user's own site or a related competitor's site.

Method 700 then proceeds to step 704, in which a list of secondary sites is generated from the primary site. A secondary site is any site (including the primary site) with an overlap of keyword rankings with the primary site. For practical reasons this list may be restricted to sites with a minimum inbound or outbound correlation or minimum number of overlapping keywords, or limited to a maximum number of sites (selecting those with the highest inbound or outbound correlation with the primary site, or largest number of overlapping keywords).

Method 700 then proceeds to step 706, in which a list of keywords is compiled for which any site in the secondary site list has a search engine result. Optionally, the keyword list may be compiled based only on paid rankings or organic rankings, or based on both paid and organic rankings. In the current embodiment both types of rankings are considered. The keywords in the keyword list are weighted by the number of distinct sites with a search engine ranking for the given keyword divided by the total number of sites in the secondary site list to generate the keyword's correlation to the site list.

Method 700 then proceeds to step 708 where the weighted keyword list is used to calculate market share, using Equation 4: Calculating Total Contribution for a Weighted Keyword List.

Calculating Total Contribution
for a Weighted Keyword List $$C = \sum_{r \in R} V_k \times CTR_p \times MS_s \times P_k \qquad \text{Equation 4}$$

$V_k$   relative volume of searches for a given keyword
$CTR_p$   average click-through rate for a given position
$MS_s$   market share (%) for the search engine
$r$   a search engine ranking a single result in a given position $p$ on a given keyword $k$ at a given search engine $s$.
$R$   all the rankings for the keywords in the keyword list
$P_k$   the correlation of keyword $k$ within the keyword list In step 710 the relative contributions of all sites is compared. The sum of the total contribution for each site is its relative search engine traffic for the given keyword list. The sum of all the relative contributions is the total market contribution, and each site's total contribution compared to the total market contribution is its market share. Each site can then be ranked based on its market share, which may be reported separately as paid, organic, and total market share.

Figure 8:
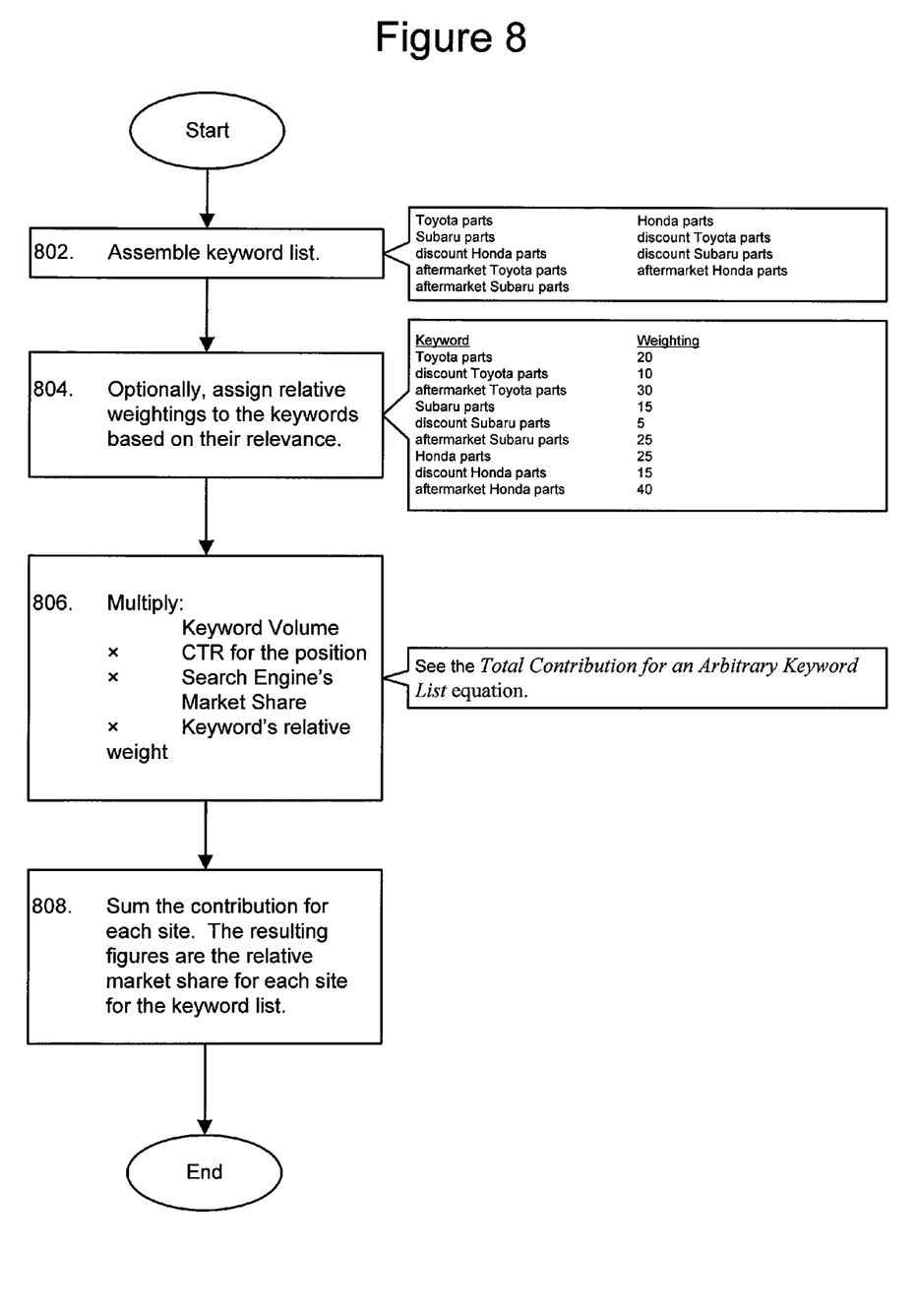
FIG. 8 illustrates a method for estimating search engine market share for websites using an arbitrary keyword list.

Reference is next made to FIG. 8 which illustrates a method 800 for estimating search engine market share for websites using an arbitrary keyword list. In some instances a user may wish to see the distribution of search engine traffic related to a specific arbitrary keyword list. The keyword list may represent a specific topic that is a targeted subtopic or is not well-represented by any archetype site.

For example, a retailer of aftermarket auto parts may want to research the different categories of auto parts separately. The retailer may wish to create a list of keywords related to each make or style of automobile. The list can be generated programmatically by examining search domains or relationships between sites and their keywords, by filtering or expanding on a list provided by a third party, by permutation of related keywords, by a user with domain knowledge or by any other means.

Method 800 begins at step 802, in which the keyword list is assembled. The keyword list can be any set of keywords with a known or estimable relative search volume. If some keywords are to be included with an unknown search volume, a search volume may be estimated for those keywords.

Method 800 then proceeds to step 804, in which relative weightings are applied to each keyword. The relative weightings are selected to reflect the relative importance of each keyword to the topic of interest to the user. The keyword weightings are used to accentuate keywords that are more important or to downplay certain keywords that are only tangentially related to the topic of interest. For example, the auto parts retailer may assign a higher relative weighting to the keyword "parts" for an auto parts company and may assign a lower relative weighting to the keyword "racing". Optionally, the user may weight some or all of the keywords equally.

Once the keyword list with relative weightings is assembled the method continues at step 806, where individual keyword contributions are calculated for sites having one or more search engine rankings for any of the keywords, using Equation 5: Calculating Total Contribution for an Arbitrary Keyword List.

Calculating Total Contribution for an Arbitrary Keyword List $$C = \sum_{r \in R} V_k \times CTR_p \times MS_s \times W_k \qquad \text{Equation 5}$$

$V_k$ relative volume of searches for a given keyword
$CTR_p$ average click-through rate for a given position
$MS_s$ market share (%) for the search engine
$r$ a search engine ranking: a single result in a given position $p$ on a given keyword $k$ at a given search engine $s$.
$R$ all the rankings for the keywords in the keyword list
$W_k$ the relative weighting of keyword $k$ within the keyword list Completing in step 808, method 800 calculates the sum of all contributions for all sites to establish the total market size for the keyword list. The sum of the contribution for each site is the relative search engine market share compared to the total market size. Each site can then be ranked based on its search engine market share, and reported separately as required.

In the various embodiments of FIGS. 1 to 8 and the alternative embodiments identified above, it is possible to report PPC and organic results separately as well as together in a total market share score. This information can be useful to helping customers identify competitors who are PPC-reliant and therefore susceptible to market share erosion through aggressive advertising.

The various embodiments of FIG. 1 to 8 and the various alternative embodiments mentioned above may be performed periodically and trends may be identified over time. Reporting of search engine market share results may include a time based analysis of changes in the market share of websites.

Typically, click-through-rate (CTR) is defined based on the search engine and the position of the listing. In cases where less than the entire allotment of listings is available (not all keywords have all 8 side-PPC listings on Google, for instance) we increase the estimated CTR of all other positions pro rata to have the CTR sum to 100%. There are also other adjustments to positional CTR that can be made.

In some cases, a keyword may return results that have little to do with the meaning of the keyword itself. For instance, the term Promiscuous, at the time of this writing, is returning listings related only to the pop song of the same name. Six weeks ago, near the launch of the song, the term was of less prominence and had a more varied set of results, including dictionary sites. As the term grew in search volume a trend analysis might predict an increase in traffic to sites like WordReference.com, a dictionary site, because of their historical high rankings on a newly high-traffic term.

In reality Word Reference likely received little traffic on the term Promiscuous, because those searching for it were not interested in finding out its meaning but in learning more about Nelly Furtado. Some search engines had not yet moved those less-relevant sites out of their search results. However, low CTR rates for those website may predicted by identifying a low correlation to other websites in the search results. WordReference will have a low correlation with sites like NellyFurtado.com, Sing365.com, and MetroLyrics.com, allowing it to be identified as an off-topic listing and reduce its estimated CTR to compensate.

The present invention has been described here by way of example only. Various modification and variations may be made to these exemplary embodiments without departing from the spirit and scope of the invention, which is limited only by the appended claims.

The present invention has been described here by way of example only. Various modification and variations may be made to these exemplary embodiments without departing from the spirit and scope of the invention, which is limited only by the appended claims.

We claim:

1. A method of estimating search engine market share for a plurality of websites, the method comprising:
    assembling a set of search terms together with the relative frequency of searches conducted using each of the search terms;
    assembling, at a computing system comprising a processor and a memory, search engine results for each of the search terms using one or more search engines, wherein the search engine results include a listing of websites identified by one or more searches for each of the search terms and ranking information for the websites in each search, wherein the ranking information includes the rank positions of each website in each search;
    assembling, at the computing system, click-through rates for different ranking positions; and
    calculating, at the computing system, the market share for at least some of the websites by combining the search engine results and the click-through rates, wherein the market share of a website is calculated by summing the contribution of each keyword to the website's total market share as follows:

$$C = \sum_{r \in R} V_k \times CTR_p \times MS_s$$

wherein:

$V_k$ is the relative volume of searches for a given keyword;
$CTR_p$ is the average click-through rate for a given position;
$MS_s$ is the market share (%) for the search engine;
$r$ is a search engine ranking: a single result in a given position $p$ on a given keyword $k$ at a given search engine $s$; and
$R$ is all the rankings for the keywords in the keyword list.

2. The method of claim 1 wherein search engine results for the search terms are assembled for a single search engine and the search engine's market share is deemed to be 100%.

3. The method of claim 1 wherein search engine results for the search terms are assembled for two or more search engines and wherein the relative market share for each of the search engines is determined before calculating market shares for any of the websites.

4. The method of claim 1 wherein search engine results for each search term are assembled by performing a search for websites having search engine results on one or more search engines.

5. The method of claim 4 wherein the search engine results for each search term include a listing of websites identified by performing a search using the search term, and wherein a selected number of the identified websites are retained in the search engine results for the search term, based on the ranking of the identified websites in the search.

6. The method of claim 1 wherein the ranking information identifies whether a website is identified in a search as a paid search result or an organic search result.

7. The method of claim 1 wherein the search engine results include only websites identified as PPC results.

8. The method of claim 1 wherein the search engine results include only websites identified as organic results.

\* \* \* \* \*